No. 814,747. PATENTED MAR. 13, 1906.
T. J. SULLIVAN.
BEET HARVESTER.
APPLICATION FILED MAR. 3, 1904.
3 SHEETS—SHEET 1.
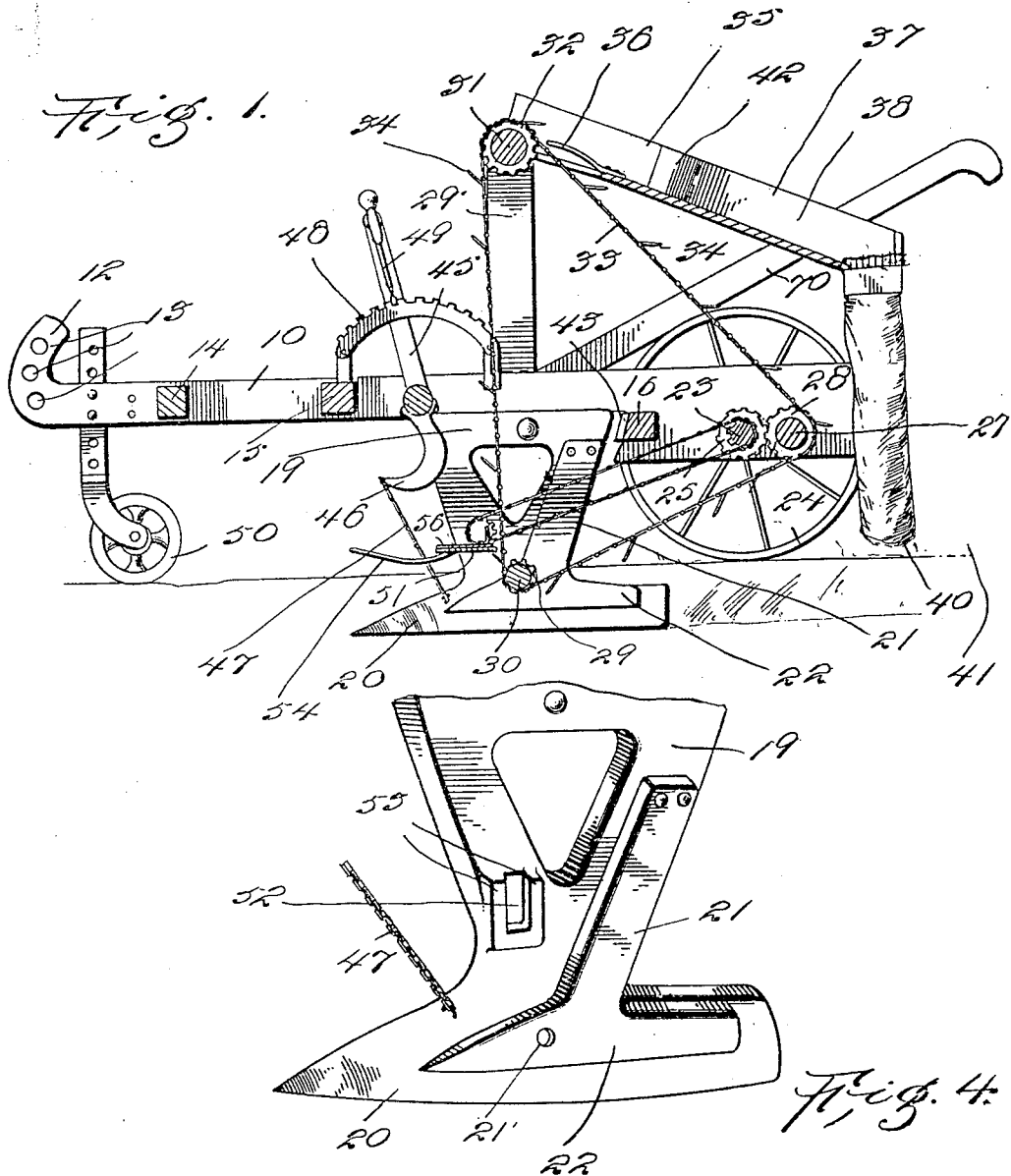
Witnesses
O. M. Simpson
J. C. Jones
Inventor
T. J. Sullivan
By
Chandler & Chandler
Attorneys No. 814,747. PATENTED MAR. 13, 1906.
T. J. SULLIVAN.
BEET HARVESTER.
APPLICATION FILED MAR. 3, 1904.
3 SHEETS—SHEET 2.
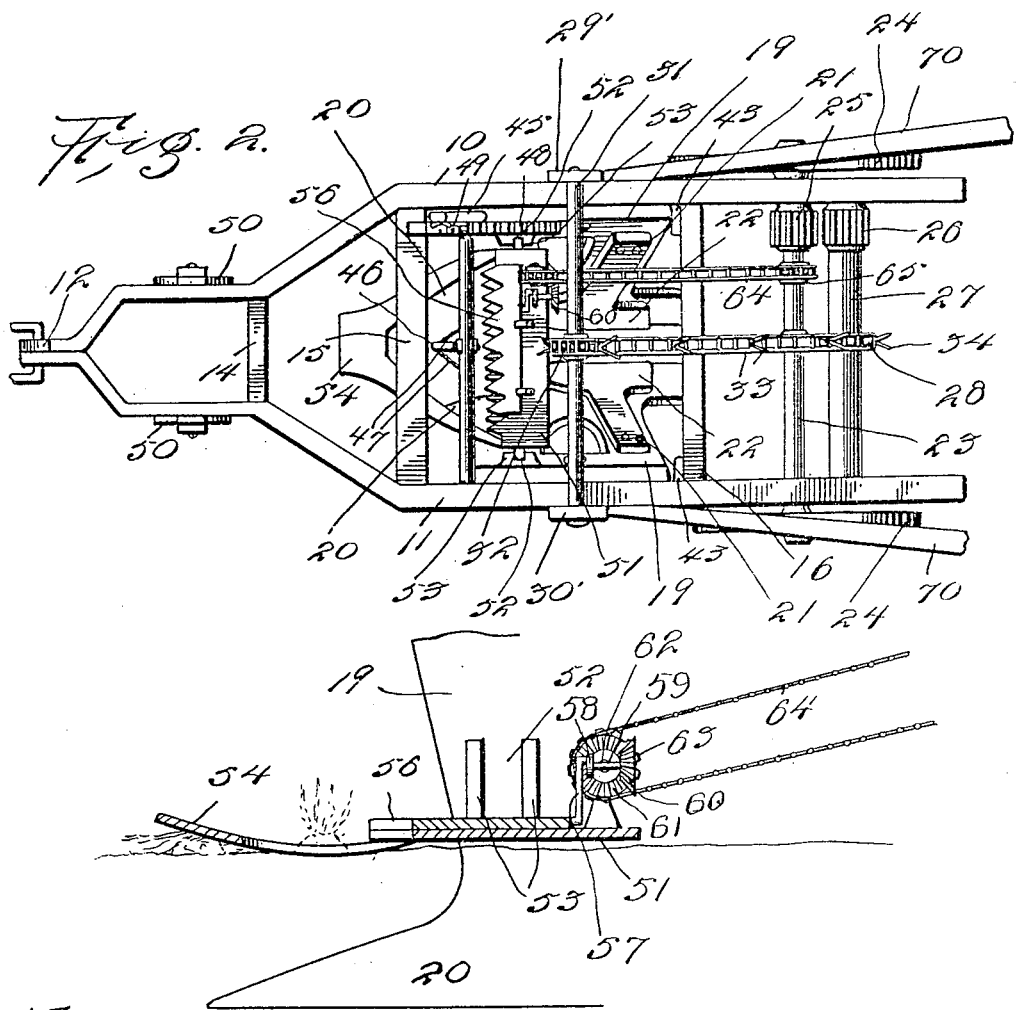
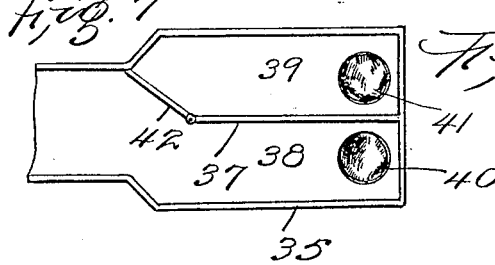
Witnesses
Inventor
T. J. Sullivan
By
Chandler & Chandler
Attorneys No. 814,747. PATENTED MAR. 13, 1906.
T. J. SULLIVAN.
BEET HARVESTER.
APPLICATION FILED MAR. 3, 1904.

3 SHEETS—SHEET 3.

Witnesses
Inventor
T. J. Sullivan
By
Chandlee Chandlee
Attorneys

UNITED STATES PATENT OFFICE.

TIMOTHY J. SULLIVAN, OF READ, COLORADO.

BEET-HARVESTER.

No. 814,747.      Specification of Letters Patent.      Patented March 13, 1906.

Application filed March 3, 1904. Serial No. 196,302.

*To all whom it may concern:*

Be it known that I, TIMOTHY J. SULLIVAN, a citizen of the United States, residing at Read, in the county of Delta, State of Colorado, have invented certain new and useful Improvements in Beet-Harvesters; and I do hereby declare the following to be a full, clear, and exact description of the invention, such as will enable others skilled in the art to which it appertains to make and use the same.

This invention relates to beet-harvesters; and it has for its object to provide an implement which may be operated upon growing beets to top them and subsequently lift them from the ground, elevate them, and discharge them into sacks or other receptacles.

A further object of the invention is to provide a construction wherein the excavating-plows may be adjusted to enter the earth to a greater or lesser depth and wherein the topping apparatus will be automatically adjusted to correspond to the different heights to which the beets project, so that the tops of all of the beets and nothing but the tops will be removed.

Other objects and advantages of the invention will be understood from the following description.

Figure 6:
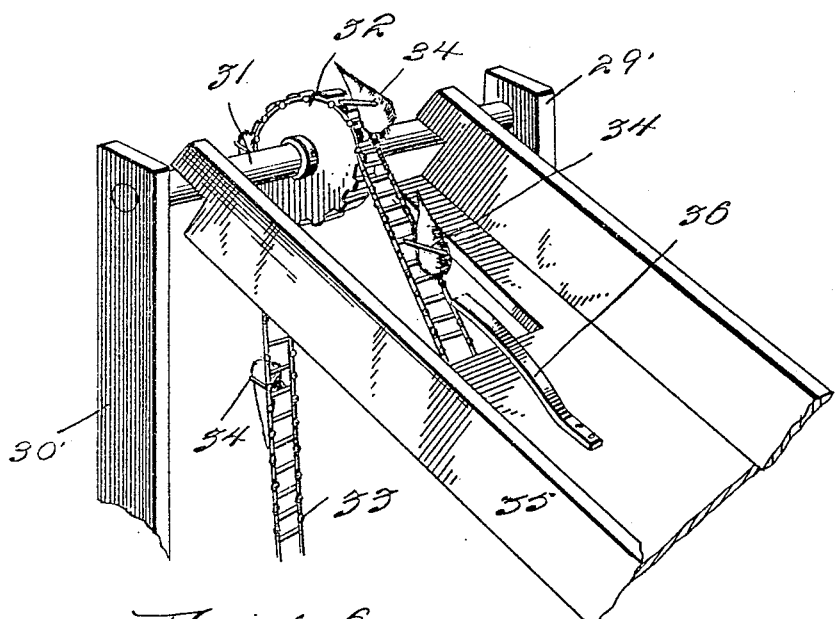
Figure 5:
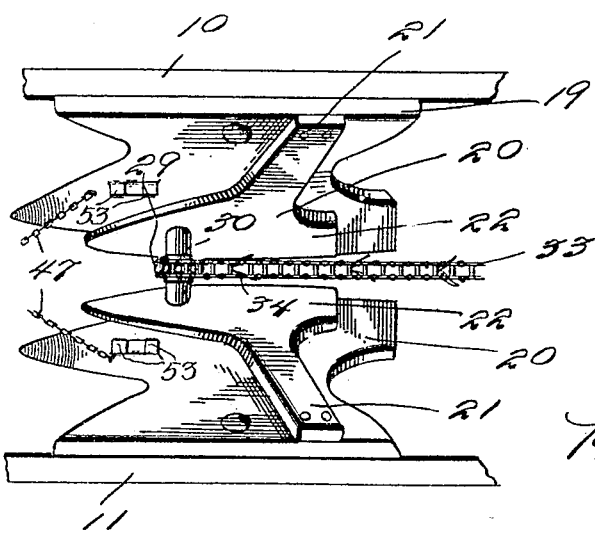

In the drawings forming a portion of this specification, and in which like numerals of reference indicate similar parts in the several views, Figure 1 is a view showing the frame of the implement in vertical longitudinal section with the parts of the mechanism in section and parts in elevation. Fig. 2 is a top plan view of the mechanism with the conveyer-chute removed. Fig. 3 is a sectional view through the topper and illustrating the means for adjusting its height to correspond to different beets. Fig. 4 is a detail view showing in perspective a main plow-shaft and its supplemental plow. Fig. 5 is a top plan view showing a portion of the main frame with the main plow-shaft and supplemental plows and a portion of the elevating chain. Fig. 6 is a detail perspective view showing a portion of the elevating chain and the chute into which the beets are discharged. Fig. 7 is a top plan view showing a portion of the chute.

Referring now to the drawings, the present implement comprises a frame including sills 10 and 11, which are parallel at their rear portions and the front portions of which are brought together and then bent upwardly into hook shape, as shown at 12, said hook portion having perforations 13 therein for engagement of a clevis. These sills 10 and 11 are preferably integral and of metal, although they may be of any suitable material. The sills are connected by the cross-pieces 14 15 16.

Against the inner faces of the sills 10 and 1 are pivoted the stock portions 19 of plow-shares 20, these shares converging rearwardly and having their lower portions broadened in substantially flat-iron shape, so that they may enter the ground and pass beneath the beets and raise the latter from the ground, the beets from the rows operated upon by the two shares being urged to a common elevator which will be presently explained.

Secured rigidly to the stock 19 of each share 20 is the stock 21 of a supplemental share 22, which lies in close proximity to the inner side of the share 20. As the implement advances the beets are initially engaged and raised by the shares 20 and from them to the elevator hereinafter described.

Mounted in the rear portion of the frame is a rotatable axle 23, on which are fixed driving-wheels 24 for rotating it as the implement is drawn along. On the axle 23 is a gear 25, meshing with the gear 26 on a counter-shaft 27 at the rear of the machine and on which counter-shaft is mounted a sprocket-wheel 28, a second sprocket-wheel 29 being mounted upon a shaft 30, journaled in perforations 21' in the supplemental shares 22.

Upon the sills 10 and 11 are uprights 29' and 30', at the upper end of which is a shaft 31, carrying a sprocket-wheel 32, and engaged over these three sprocket-wheels is a sprocket-chain 33. At intervals of the sprocket-chain are attached forked fingers 34, so arranged that as the implement progresses they will pass with the chain forwardly between the rear end portions of the shares 20, so as to engage the beets and raise them over the sprocket 32. In the rear of the sprocket-wheel 32 is a chute 35, attached to which is a finger 36, that projects forwardly and which enters between the sides of each forked finger as it passes over the sprocket-wheel 32 and beneath the beet, so that as the finger continues in its rearward and downward movement the beet is removed and drops into the chute through the bottom of which the chain passes. The rear portion of the chute 35 is broadened and is divided by a partition 37 into two passages 38 and 39, having at their rear ends suitable means for attachment of bags 40 and 41 to receive the discharge therefrom. At the forward end of the partition 37 is a gate 42, which may be swung into position to communicate either of the passages 38 and 39 with the forward portion of the chute and to close the other passage, so that the beets will be discharged from one passage until the corresponding bag is full and may be then discharged from the other passage while the filled bag is being emptied or replaced.

The stocks 19 are pivoted in the frame, as above mentioned, and their rearward pivotal movements are limited by a buffer 43 on the cross-beam 10, so that the depth to which the shares will enter the ground will be limited. When it is desired to have the shares enter the ground to a lesser depth, the front ends thereof are raised through the medium of a lever 45, which is pivoted in the frame and to the forwardly-directed hook 46, at the lower end of which are attached chains 47, connected to the shares 20. A notched segment 48 is disposed for engagement by the bolt 49 on the lever 45 to hold the lever in its different adjusted position. The depth to which the shares 20 enter the ground is further regulated by the caster-wheel 50, which is connected to the sill 10 for vertical adjustment, so that the front end of the implement may be raised and lowered.

In order that the tops of the beets may be cut off before the beets are thrown out of the ground, a cutter-bar 51 is provided and is mounted at its ends in guides 52 in lugs 53, that are formed upon the lower portions of the inner faces of the standards 19, so that the cutter-bar may rise and fall to correspond to the different heights of the beets above the ground. A spring-arm 54 is attached to the cutter-bar and extends forwardly therebeyond and has its forward end curved slightly upwardly, so that it may run upon and ride over the tops of the beets and raise the cutter-bar to the proper height to cut off the top close to the body of the beet. Upon the cutter-bar is mounted a reciprocatory knife 56, which engages and cuts off the tops of the beets and is connected, by means of the pitman 57, with a crank-disk 58, carried by a shaft 59 on the cutter-bar, said shaft having a beveled gear 60, with which meshes a second gear 61, carried by a shaft 62, mounted also upon the cutter-bar and provided with a sprocket-wheel 63. A sprocket-chain 64 is engaged with the wheel 63 and with a sprocket-wheel 65 on the axle 23, so that as the implement advances the knife is operated.

In order to control the implement in its movement, handles 70 are connected to the sills of the frame and project rearwardly therebeyond

What is claimed is—

1. A beet-harvester comprising a frame, laterally-spaced excavating devices secured to the frame, supplemental devices disposed between said excavating devices and adapted to receive the beets therefrom, a shaft mounted in the supplemental devices and bridging the space therebetween, a sprocket-wheel carried by the shaft and an elevator engaged with said sprocket-wheel and movable thereon and adapted to receive the beets from said supplemental devices.

2. A beet-harvester comprising a frame, laterally-spaced excavating devices secured to the frame and separated at their rear end by a narrowed throat, supplemental devices disposed between said excavating devices in position to receive beets therefrom, an elevator movable through the throat in position to receive beets from the supplemental devices, and a topping mechanism carried by the excavating devices in advance of said supplemental devices.

3. A beet-harvester comprising a frame, laterally-spaced excavating devices secured to the frame and separated at their rear end by a narrowed throat, supplemental devices disposed between said excavating devices in position to receive beets therefrom, an elevator movable through the throat in position to receive beets from the supplemental devices, and a topping mechanism carried by the excavating devices in advance of said supplemental devices, said topping mechanism being vertically movable independently of the excavating devices.

4. A beet-harvester comprising a frame, laterally-spaced excavating devices secured to the frame, supplemental devices disposed between the excavating devices and adapted to receive beets therefrom, an elevator movable between the supplemental devices in position to receive the beets therefrom, a chute disposed to receive from the elevator, a vertically-adjustable topping mechanism carried by the excavators in advance of the supplemental devices, and a spring-arm carried by the connecting mechanism and extending forwardly and downwardly therefrom to raise the cutting mechanism.

5. A beet-harvester comprising a frame, laterally-spaced excavating devices pivoted to the frame for movement to enter the ground to varying depths, stops for limiting the movement of said excavators in one direction and means for shifting the excavators in the opposite direction.

In testimony whereof I affix my signature in presence of two witnesses.

TIMOTHY J. SULLIVAN.

Witnesses:
MILLARD FAIRLAMB,
ANNA NUTTER.